(12) United States Patent
Mizumura

(10) Patent No.: US 6,526,232 B1
(45) Date of Patent: Feb. 25, 2003

(54) LENS CONTROL UNIT

(75) Inventor: Hiroshi Mizumura, Omiya (JP)

(73) Assignee: Fuji Photo Optical Co., Ltd., Saitama (JP)

( * ) Notice: Subject to any disclaimer, the term of this patent is extended or adjusted under 35 U.S.C. 154(b) by 0 days.

(21) Appl. No.: 09/550,501

(22) Filed: Apr. 14, 2000

(30) Foreign Application Priority Data

Apr. 16, 1999 (JP) ............................................ 11-110031

(51) Int. Cl.⁷ .......................... G03B 17/00; G03B 3/12; H04N 5/232
(52) U.S. Cl. .............................. 396/72; 396/76; 396/86; 396/103; 352/179; 348/211.99
(58) Field of Search .................... 396/72, 79, 76, 396/86, 131, 103; 348/211.99, 335, 357, 358

(56) References Cited

U.S. PATENT DOCUMENTS

| | | | |
|---|---|---|---|
| 4,244,006 A | * | 1/1981 | Kitahara et al. ............ 348/213 |
| 5,068,735 A | * | 11/1991 | Tuchiya et al. ............. 348/213 |
| 5,570,177 A | * | 10/1996 | Parker et al. .......... 356/139.06 |
| 5,845,044 A | * | 12/1998 | Iizuka et al. ................. 386/117 |
| 5,929,904 A | * | 7/1999 | Uchida ....................... 348/211 |
| 6,052,537 A | * | 4/2000 | Sasaki ....................... 366/103 |

OTHER PUBLICATIONS

Telemetrics Inc., Oct. 1999, pp. 1–4.*
Leaflet from NAB Convention showing prototype of controller, Las Vegas, Nevada, Apr. 19, 1999.*

* cited by examiner

Primary Examiner—Russell Adams
Assistant Examiner—Arthur A Smith
(74) Attorney, Agent, or Firm—Birch, Stewart, Kolasch & Birch, LLP

(57) ABSTRACT

A lens control unit is provided in which a position of an operating member for operating a zoom position or a focus position of a lens unit is moved by following the actual zoom position or the focus position of the lens unit in the case where a shot function for instantly reproducing the zoom position and the focus position of the lens unit that are stored beforehand is executed, thereby the operating member can control the zoom or focus of the lens unit with the zoom position or focus position that is moved by the shot function as the origins. A lens operation screen is displayed on a monitor of a personal computer, which is connected to the lens unit. A manual operation screen and a shot operation screen are displayed on the lens operation screen. Zoom, focus, iris and extender of the lens unit are manually operated in the manual operation screen. In the shot operation screen, the shot function is executed to move the zoom and focus of the lens unit to positions that are registered beforehand.

19 Claims, 15 Drawing Sheets

F I G. 6

F I G. 7
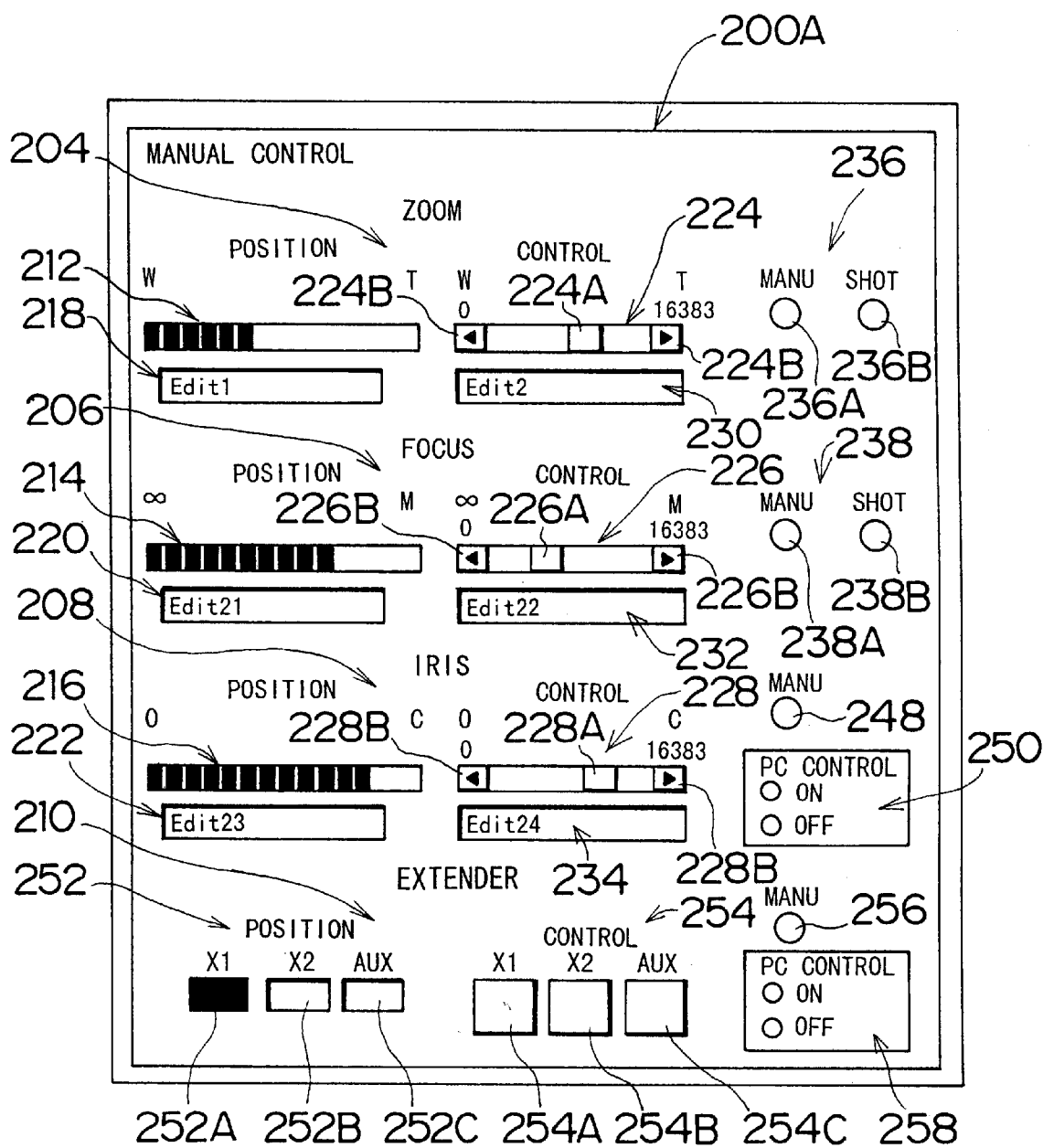

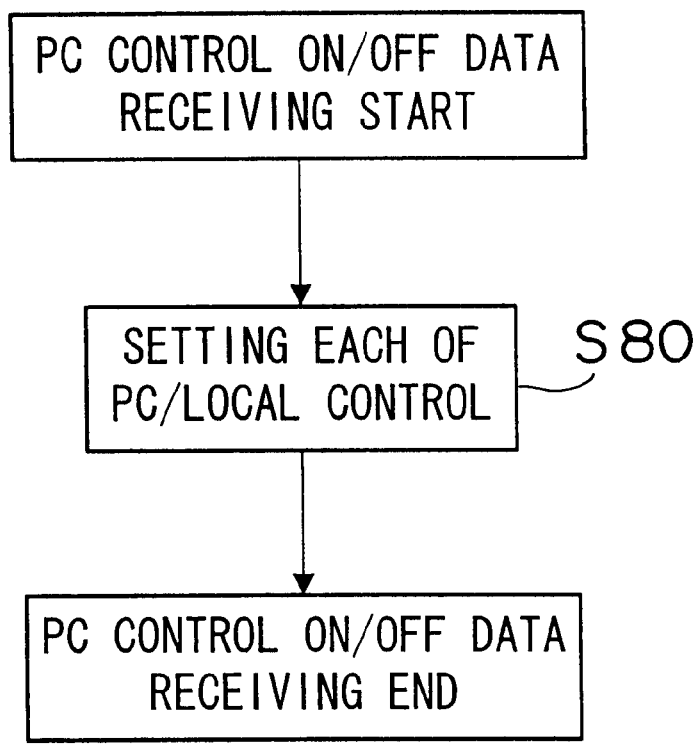

F I G. 1 3
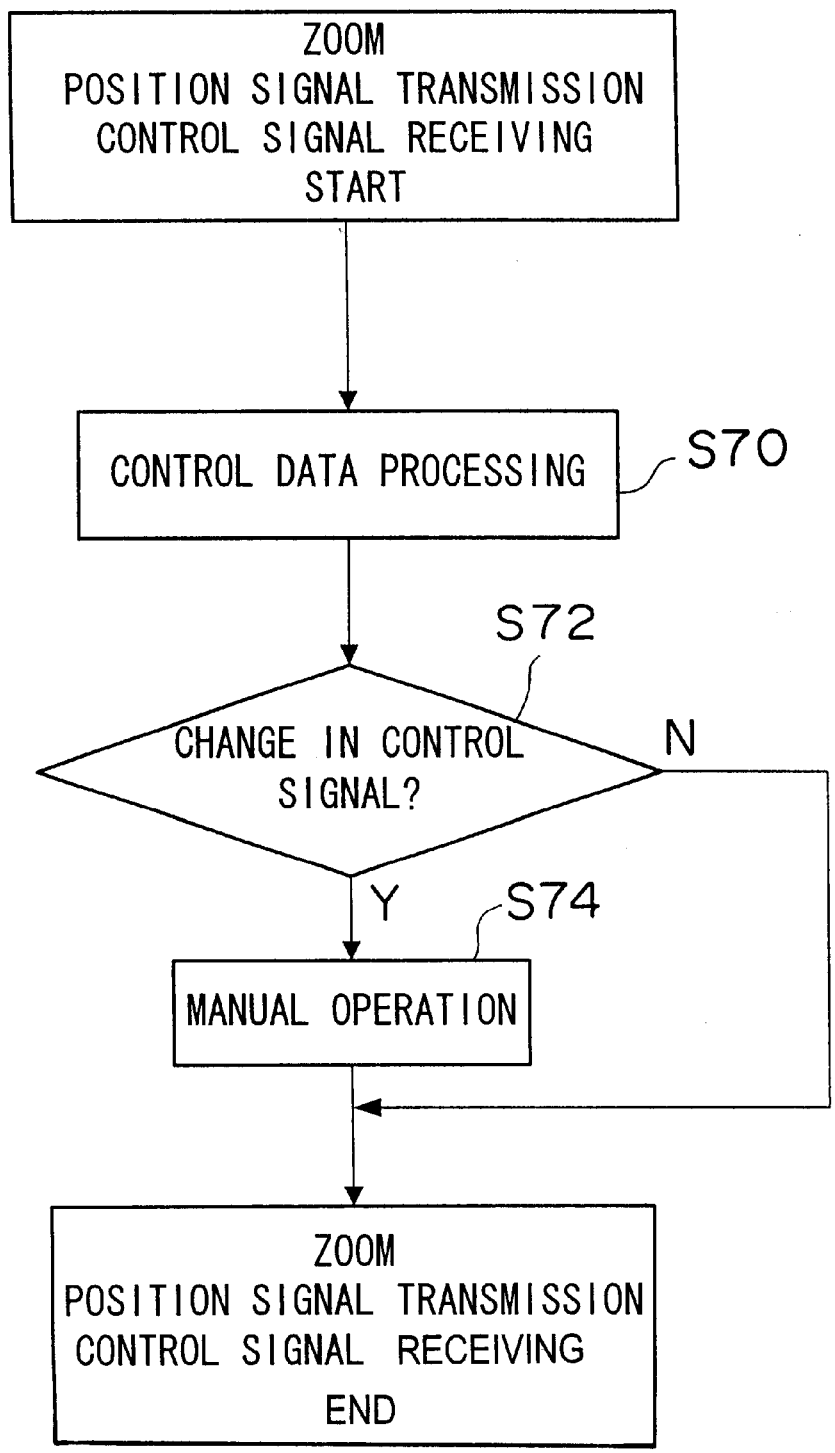

LENS CONTROL UNIT

BACKGROUND OF THE INVENTION

1. Field of the Invention

The present invention relates to a lens control unit, more particularly to a lens control unit that controls a lens or an iris of a lens unit by means of a personal computer.

2. Description of Related Art

A lens unit, such as an ENG lens and an EFP lens, is mounted on a TV camera, and the lens unit is connected with a lens controller (lens operating unit) such as a zoom controller and a focus controller. Operating members of the lens controller are operated so as to transmit a control signal to the lens unit, thereby a motor in the lens unit is driven so that lens control operations such as zoom, focus, and iris, are performed.

In a lens control unit, a "shot function" so called is installed, which registers beforehand desired zoom and focus positions in the lens controller, and instantly reproduces the registered zoom and focus positions by turning a shot switch on, which is provided on the lens controller. However, after the shot function is executed and the zoom position or the focus position is moved to the shot position, which is registered beforehand, a deviation is generated between the zoom position or the focus position that is instructed by the operating member of the lens controller and the actual zoom or focus position that has been moved to the shot position. Thus, the zoom position or the focus position could not be controlled using the shot position as an origin because the zoom position or the focus position temporarily returns to a position instructed by the operating member if the operating members are operated after the execution of the shot function. On the other hand, a lens control unit is proposed to control the displacement of the operating members as a variation of the zoom position or the focus position, in order to control zoom or focus using the shot position as the origin. However in such a case, a problem has arisen in that a movable end of the operating member and a movable end of the zoom position or the focus position do not correspond to each other, and a range uncontrollable by the operating member is generated in the movable area of the zoom position or the focus position.

SUMMARY OF THE INVENTION

The present invention has been developed in view of the above-described circumstances, and has as its object the provision of a lens control unit which can control a position of the lens using the shot position as the origin to where the lens is moved by the shot function when the shot function is executed with respect to the predetermined lens such as a zoom lens and a focus lens, and at the same time can prevent the range which is uncontrollable by the operating members from generating in the area where the lens is movable.

In order to achieve the above-described object, the present invention is directed to a lens control unit, comprising: an operating member; and a control part which moves a lens disposed in a lens barrel in accordance with a position of the operating member, the control part having a shot function for moving the lens to a position registered beforehand and moving the operating member to a position corresponding to the position of the lens in response to an instruction to execute the shot function.

According to the present invention, the operating members and the lens position move together when the lens position is moved to the shot position by the shot execution. Therefore, no deviation is generated between the actual lens position and the operating position of the operating members, and more advantageously, the lens can be controlled using the lens position where the lens is moved by the shot execution as the origin, while the range which is uncontrollable by the operating member can be prevented from generating in the area where the lens is movable.

In order to achieve the above-described object, the present invention is directed to a lens control unit, comprising: a display which displays an image of an operating member; an inputting device which moves the operating member on the display; and a control part which moves a lens disposed in a lens barrel in accordance with a position of the operating member on the display, the control part having a shot function for moving the lens to a position registered beforehand and moving the operating member on the display to a position corresponding to the position of the lens in response to an instruction to execute the shot function.

According to the present invention, the operating member is displayed on the screen and the operation is performed on the screen; thus during the shot execution the operating position of the operating members can easily be moved to the actual lens position.

Preferably, the control part has a return function for returning, in response to an instruction to execute the return function from a predetermined commanding device after the shot function is executed, the lens to a position at which the lens was positioned when the shot function was started.

According to the present invention, the operating members can be returned to the lens position when the shot execution was started, even though the operation positions of the operating members are moved to the actual lens position during the shot execution.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein:

FIG. 6 is a view illustrating a constitution of a lens operation screen to be displayed on a monitor of the personal computer;

FIG. 7 is a view illustrating a constitution of a manual operation screen of the lens operation screen to be displayed on the monitor of the personal computer;

FIG. 12 is a flow chart showing a process routine for receiving ON/OFF information for controlling the personal computer of the drive unit for the ENG lens in the CPU;

FIG. 13 is a flow chart showing a process routine for zoom position signal transmission and control signal receiving of the drive unit for the ENG lens in the CPU;

DETAILED DESCRIPTION OF THE PREFERRED EMBODIMENT

Hereunder a preferred embodiment of a lens drive unit of the present invention will be described in detail according to the accompanying drawings.

Figure 1:
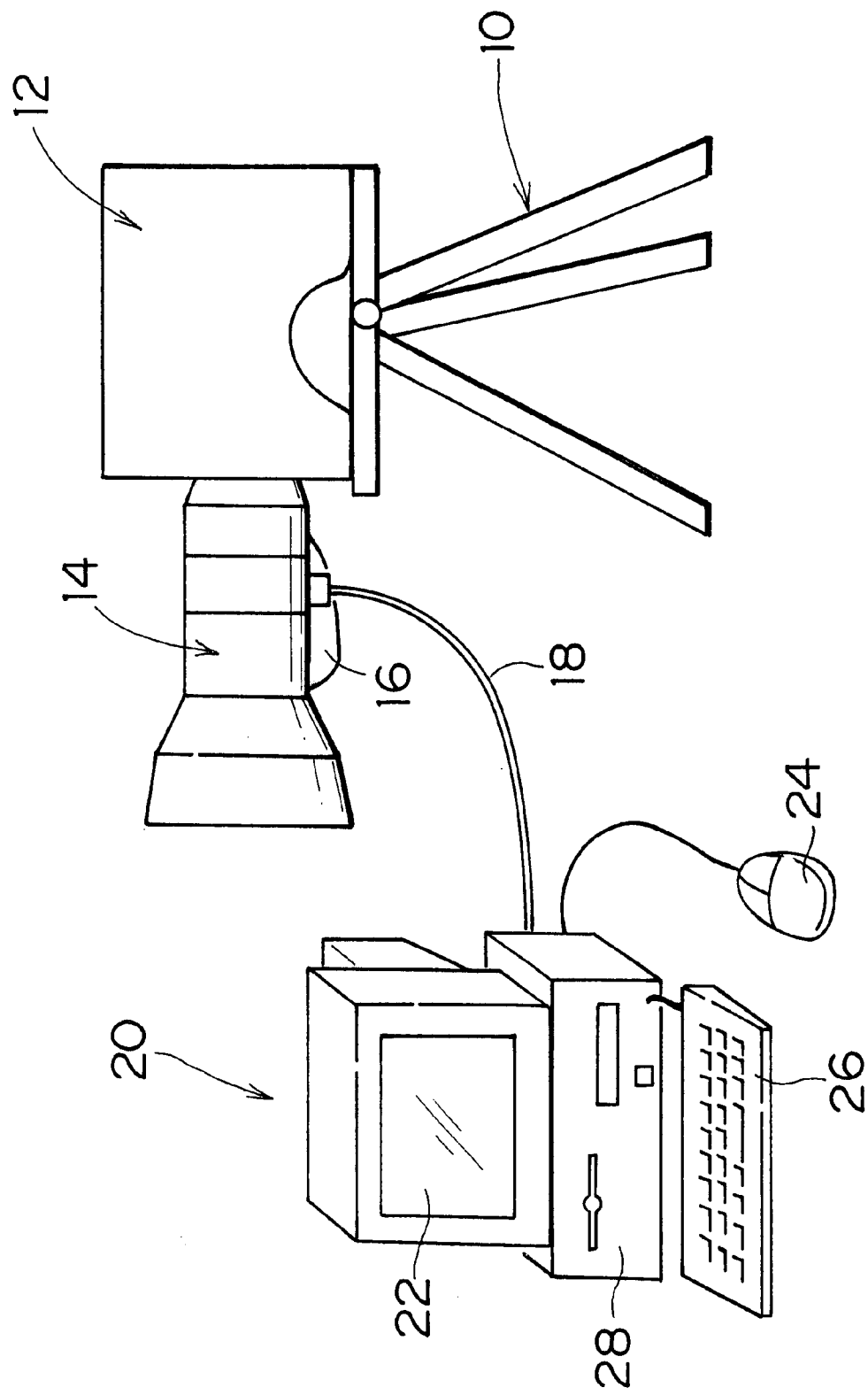
FIG. 1 is a constructional view showing an embodiment of a TV lens system to which the present invention is applied.

FIG. 1 is a constructional view of showing a TV lens system according to an embodiment of the present invention. As shown in FIG. 1, a TV camera body 12 is mounted on a tripod 10, and an ENG lens 14 is mounted on the camera body 12. A drive unit 16 including motors to rotate a zoom ring, a focus ring and an iris ring, which are provided on a lens barrel of the ENG lens 14, is mounted to the ENG lens 14; the details of the construction will be described later. The drive unit 16 is provided with an RS232C connector, to which a personal computer 20 is connected via a communication cable 18.

Programs for operating zoom, focus and iris adjustments and the like of the ENG lens 14 are executed by the personal computer 20. A user operates the personal computer 20 with an operation screen displayed on a monitor 22 using input equipment such as a mouse 24 and a keyboard 26, so that a control signal corresponding to the operation is transmitted from a main body 28 of the personal computer 20 via the communication cable 18 to the drive unit 16 of the ENG lens 14. Thereby, the personal computer 20 controls respective motors of the drive unit 16, and the zoom, focus and iris adjustments of the ENG lens 14 can be performed.

Figure 2:
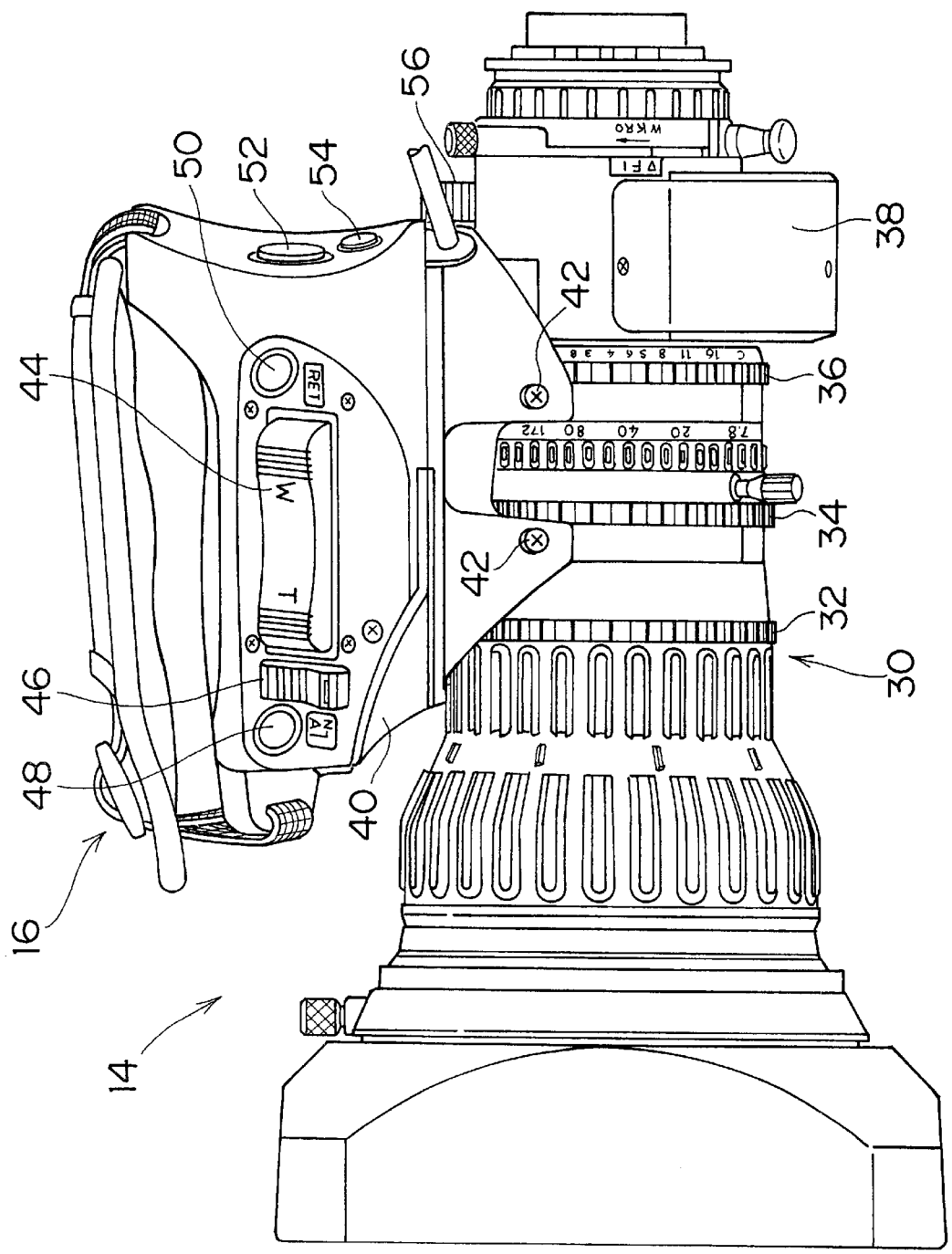
FIG. 2 is a plan view of an external appearance of an ENG lens.
Figure 3:
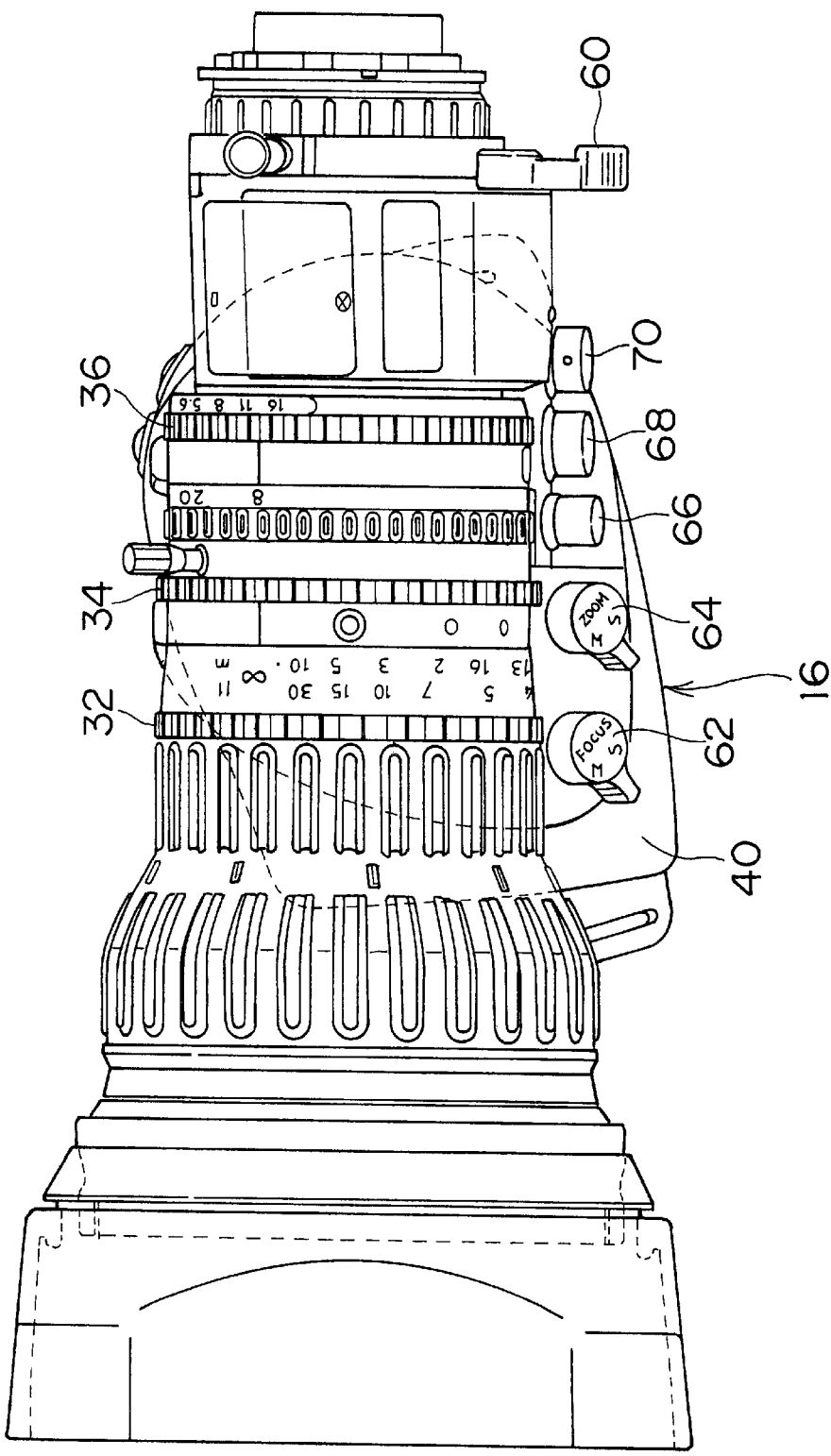
FIG. 3 is a side view of an external appearance of the ENG lens.

FIGS. 2 and 3 are a plan view and a side view, respectively, showing an external appearance of the ENG lens 14. The ENG lens 14 shown in FIGS. 2 and 3 is an inner focus zoom lens, which is used for a broadcast TV camera such as an ENG camera. The lens barrel 30 is provided with the focus ring 32, the zoom ring 34, and the iris ring 36; and further, an extender system 38 is provided at the rear end of the lens barrel 30.

Figure 4:
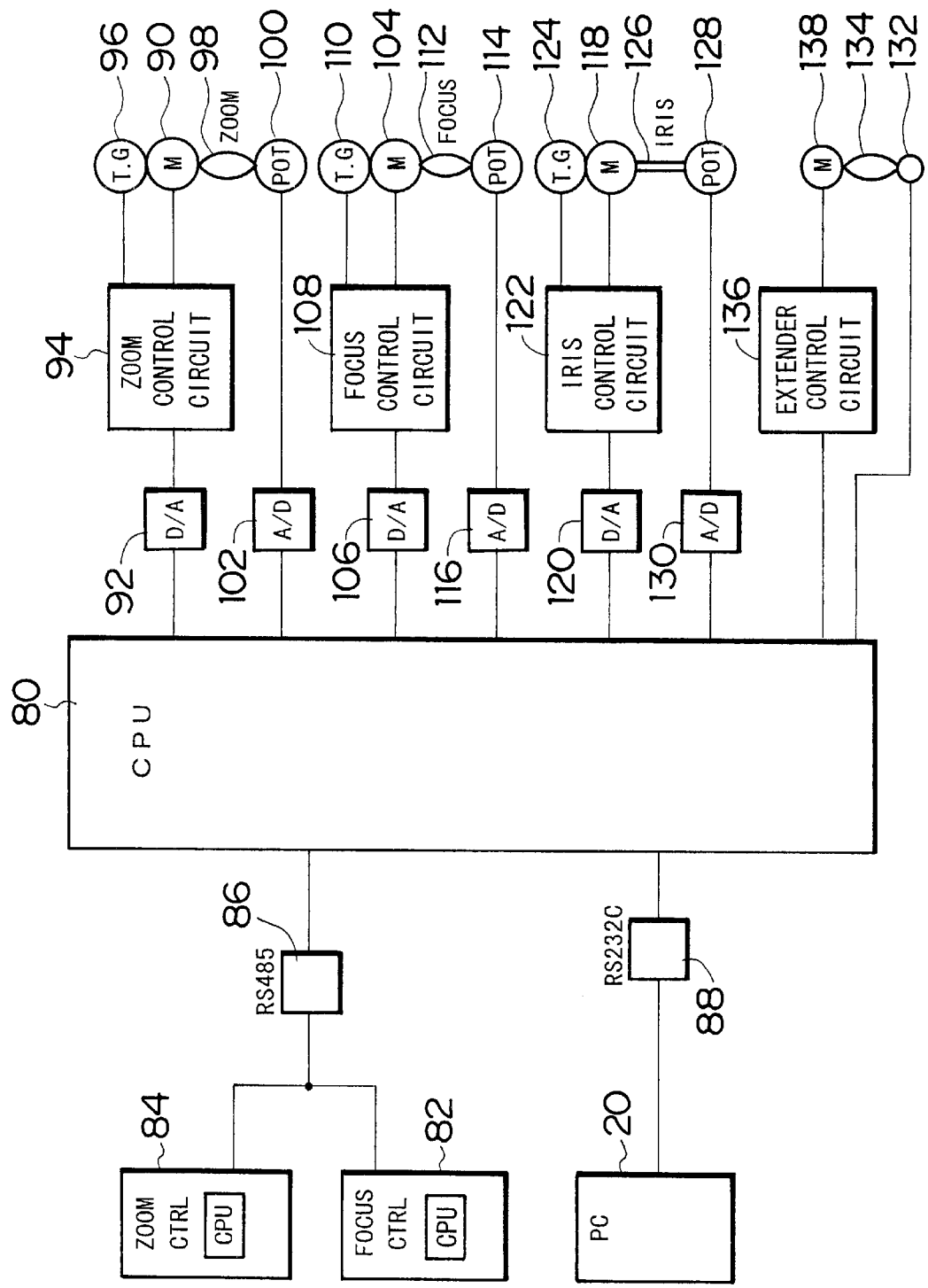
FIG. 4 is a block diagram showing a motor control circuit of a drive unit for the ENG lens.

The inner structure of the lens barrel 30 is not illustrated in FIG. 2; however, as well known, naming from the front, a fixed focus lens, a movable focus lens 112, a zoom lens 98, an iris 126, a relay lens, and so forth are provided in the lens barrel 30, and an extender lens 134 is arranged at the rear (see FIG. 4). Rotating the focus ring 32 moves the movable focus lens 112 back and forth along the optical axis so as to adjust the focus, and rotating the zoom ring 34 moves the zoom lens 98 back and forth so as to adjust the zoom. Moreover, a diameter of the iris 126 is adjusted by rotating the iris ring 36.

The drive unit 16, for driving the focus ring 32, the zoom ring 34, and the iris ring 36, and the like, is mounted on a side of the lens barrel 30. The drive unit 16 has a case 40, which is attached on the side of the lens barrel 30 with screws 42. A focus drive motor 104 (see FIG. 4) is arranged in the case 40, and the focus drive motor 104 is operatively connected with the focus ring 32 via a gear transmission mechanism (not shown), so as to rotate and drive the focus ring 32. A zoom drive motor 90 (see FIG. 4) is also arranged in the case 40, and the zoom drive motor 90 is operatively connected with the zoom ring 34 via a gear transmission mechanism (not shown), so as to rotate and drive the zoom ring 34. Similarly, an iris drive motor 118 (see FIG. 4) is arranged in the case 40, and the iris drive motor 118 is operatively connected with the iris ring 36 via a gear transmission mechanism (not shown), so as to rotate and drive the iris ring 36.

On the surface of the case 40, respective operating switches such as a zoom seesaw control switch 44 (hereunder named a seesaw switch), an iris auto/manual modes changeover switch 46, an iris momentary switch 48, a return switch 50, a VTR switch 52, a quick switch 54, and so forth, are disposed. The detailed description on operations of the operation switches will be omitted, but briefly describing, the seesaw switch 44 is provided to swing with a neutral position as a reference, and when pressing the seesaw switch 44 to a telephoto (T) side or to a wide angle (W) side, the zoom ring 34 is rotated to the telephoto side or to the wide angle side.

A knob 56, disposed at the rear face of the case 40, is a maximum zoom rate adjustment knob for adjusting a maximum zoom rate, which is a zoom rate when the seesaw switch 44 is pressed the deepest (most intensely). A reference numeral 60 in FIG. 3 denotes an extender switch lever; for example, 2-power extender lens can be inserted/pulled-out into/from the shooting optical path by rotating the lever 60.

Moreover, as shown in FIG. 3, there are a focus servo/manual switch knob 62, a zoom servo/manual switch knob 64, the RS232C connector 66, a focus control connector 68, and a zoom control connector 70, all of which are provided at the bottom of the case 40. The focus control connector 68 is typically connected with a focus controller, which instructs a focus position with a rotational position of a rotatable focus knob. The zoom control connector 70 is typically connected with a zoom controller, which designates (controls) a zoom rate with a rotational position of a rotatable thumb ring. When connecting external controllers such as the focus controller and zoom controller with the connectors 68 and 70, the focus drive motor 104 and the zoom drive motor 90 of the drive unit 16 are controlled in accordance with the external controllers. Additionally, data are exchanged by RS485 interface through the connectors 68 and 70.

The connector 66 for RS232C is connected with external equipment via an RS232C cable. The data are exchanged between the drive unit 16 and the external equipment through the connector 66 with the RS232C interface. As indicated in FIG. 1, when connecting the personal computer 20 with the drive unit 16, the personal computer 20 is connected with the RS232C connector 66. The RS232C connector 66 is also connected with the external equipment when self-diagnosing the ENG lens 14.

FIG. 4 is a block diagram showing a motor control circuit of the drive unit 16. As shown in FIG. 4, when the focus control connector 68 is connected with the focus controller 82, or when the zoom control connector 70 is connected with the zoom controller 84, a CPU 80 installed in the drive unit 16 obtains via an RS485 interface 86 a control signal outputted from the focus controller 82 or the zoom controller 84.

When the RS232C connector 66 is connected with the personal computer 20 as shown in FIG. 1, the CPU 80 receives the control signal from the personal computer 20 and also transmits necessary data to the personal computer 20 via an RS232C interface 88.

Although not shown in FIG. 4, the CPU 80 of the drive unit 16 detects operations of the respective operating members disposed in the drive unit 16, and executes respective processes in accordance with the operations. However, in a case which will be described below, assume that there is no operation for the operating members.

When receiving a control signal with regard to zoom from the personal computer 20 or the zoom controller 84, the CPU 80 generates a control signal to command a rotation speed of the zoom drive motor 90 (a moving speed of the zoom lens 98) in accordance with the control signal, and provides the control signal to a zoom control circuit 94 after converting the control signal into an analog signal by a D/A converter 92.

The zoom control circuit 94 obtains the control signal outputted from the CPU 80 as described above, and obtains from a tachogenerator 96 an actual rotation speed of the zoom drive motor 90. Then, the zoom control 94 applies voltage to the zoom drive motor 90 such that a difference approaches zero between the rotation speed of the zoom drive motor 90 that is commanded in accordance with the control signal from the CPU 80 and the actual rotation speed of the zoom drive motor 90 determined by the tachogenerator 96. Thereby, the zoom drive motor 90 rotates in the rotation speed that is commanded from the CPU 80. When the zoom drive motor 90 rotates as described above, the zoom ring 34 (see FIG. 2) rotates, and the zoom lens 98 thus moves.

The control signal given to the CPU 80 from the zoom controller 84 and the personal computer 20 is used for two cases: indicating a target position of the zoom lens 98 (in a case of position control), or indicating a target rate of the zoom lens 98 (in a case of rate control). When receiving a position control signal, which indicates the target position of the zoom lens 98, the CPU 80 switches the zoom control to the position control, and obtains the current position of the zoom lens 98 from a potentiometer 100 via an A/D converter 102, then outputs a control signal to the zoom control circuit 94 such that the zoom rate corresponds to the difference between the target position and the current position of the zoom lens 98. In contrast, when receiving from the zoom controller 84 or the personal computer 20 the rate control signal, which indicates the target rate of the zoom lens 98, the CPU 80 outputs the control signal to the zoom control circuit 94 such that the zoom rate is the target rate.

As similar with the case of receiving the zoom control signal, when receiving the control signal from the focus controller 82 or the personal computer 20 with regard to focus, the CPU 80 outputs to a D/A converter 106 a control signal that commands the rotation speed of the focus drive motor 104 (the moving speed of the focus lens 112) in accordance with the control signal and converts with the D/A converter 106 the control signal into an analog signal given to the focus control circuit 108.

The focus control circuit 108 obtains the control signal outputted from the CPU 80 as described above, and at the same time obtains the actual rotation speed of the focus drive motor 104 from a tachogenerator 110. Then, the focus control circuit 108 applies voltage to the focus drive motor 104 such that the difference approaches zero between the rotation speed of the focus drive motor 104 that is commanded by the control signal from the CPU 80 and the actual rotation speed of the focus drive motor 104 that is determined by the tachogenerator 110. Thereby, the focus drive motor 104 rotates in the rotation speed that is commanded from the CPU 80. By that process, the focus drive motor 104 rotates and the focus ring 32 (see FIG. 2), and the focus lens 112 thus moves.

As similar with the case of zoom control, the position control and the rate control are possible in the focus control as well. When receiving the position control signal indicating the target position of the focus lens 112, the CPU 80 switches the focus control to the position control, and obtains the current position of the focus lens 112 from a potentiometer 114 via an A/D converter 116. Then, the CPU 80 outputs to the focus control circuit 108 a control signal such that the target rate corresponds to the difference between the target position and the current position of the focus lens 112. When receiving from the focus controller 82 or the personal computer 20 the rate control signal indicating the target rate of the focus lens 112, the CPU 80 outputs to the focus control circuit 108 the control signal such that the rate is the target rate.

As similar with the case of receiving the zoom control signal, when receiving from the personal computer 20 and the like the control signal with regard to the iris 126 (a control signal with regard to the iris 126 may be received from the focus controller 82 or the zoom controller 84), the CPU 80 outputs to a D/A converter 120 a control signal that commands the rotation speed of the iris drive motor 118 in accordance with the control signal, and converts the control signal in the analog signal by the D/A converter 120, then gives the control signal to an iris control circuit 122. Iris control is normally performed by position control, and the CPU 80 obtains the current position of the iris 126 (a diameter of iris) from a potentiometer 128 via an A/D converter 130, and outputs the control signal to the iris control circuit 122 such that the rate corresponds to the difference between the target position and the current position of the iris 126.

The iris control circuit 122 obtains the control signal that is outputted from the CPU 80 as described above, and at the same time obtains from a tachogenerator 124 the actual rotation speed of the iris drive motor 118. Then, the iris control circuit 122 applies voltage to the iris drive motor 118 such that the difference approaches zero between the rotation speed of the iris drive motor 118 that is commanded in accordance with the control signal from the CPU 80 and the actual rotation speed of the iris drive motor 118 that is determined by the tachogenerator 124. Thereby, the iris drive motor 118 rotates in the rotation speed that is commanded from the CPU 80. As the iris drive motor 118 rotates in the manner described above, the iris ring 36 (see FIG. 2) rotates, and the diameter of the iris 126 is thus changed.

When receiving from the personal computer 20 and the like a control signal that designates an extender magnification of the extender unit 38, the CPU 80 determines a position of the 2-power extender lens 134 through a position sensor 132 to determine a current extender magnification. After that, if the designated extender magnification and the current extender magnification are different, the control signal that drives the extender lens 134 is outputted to an extender control circuit 136. The extender control circuit 136 drives an extender drive motor 138 in accordance with the control signal from the CPU 80, and inserts or pulls out the extender lens 134 into or from the shooting optical axis in order to adjust the magnification to be the designated extender magnification. Thereby, the extender magnification of the extender unit 38 is switched to the designated extender magnification by the personal computer 20 and the like.

The ENG lens 14, shown in FIGS. 2 and 3, is not constructed to drive the extender unit 38 by a motor; however, the present invention is not restricted to be applied to the ENG lens only. The present invention is applicable to a number of types of lenses such as an EFP lens in a box shape, and an HD lens, which is used in a high-definition camera. Further, the extender lens can be made to be driven by a motor depending on types of lens units; in an embodiment below, like the extender unit 38 as the one shown in FIG. 4, it is also driven by the motor in accordance with the control by the CPU 80.

Figure 5:
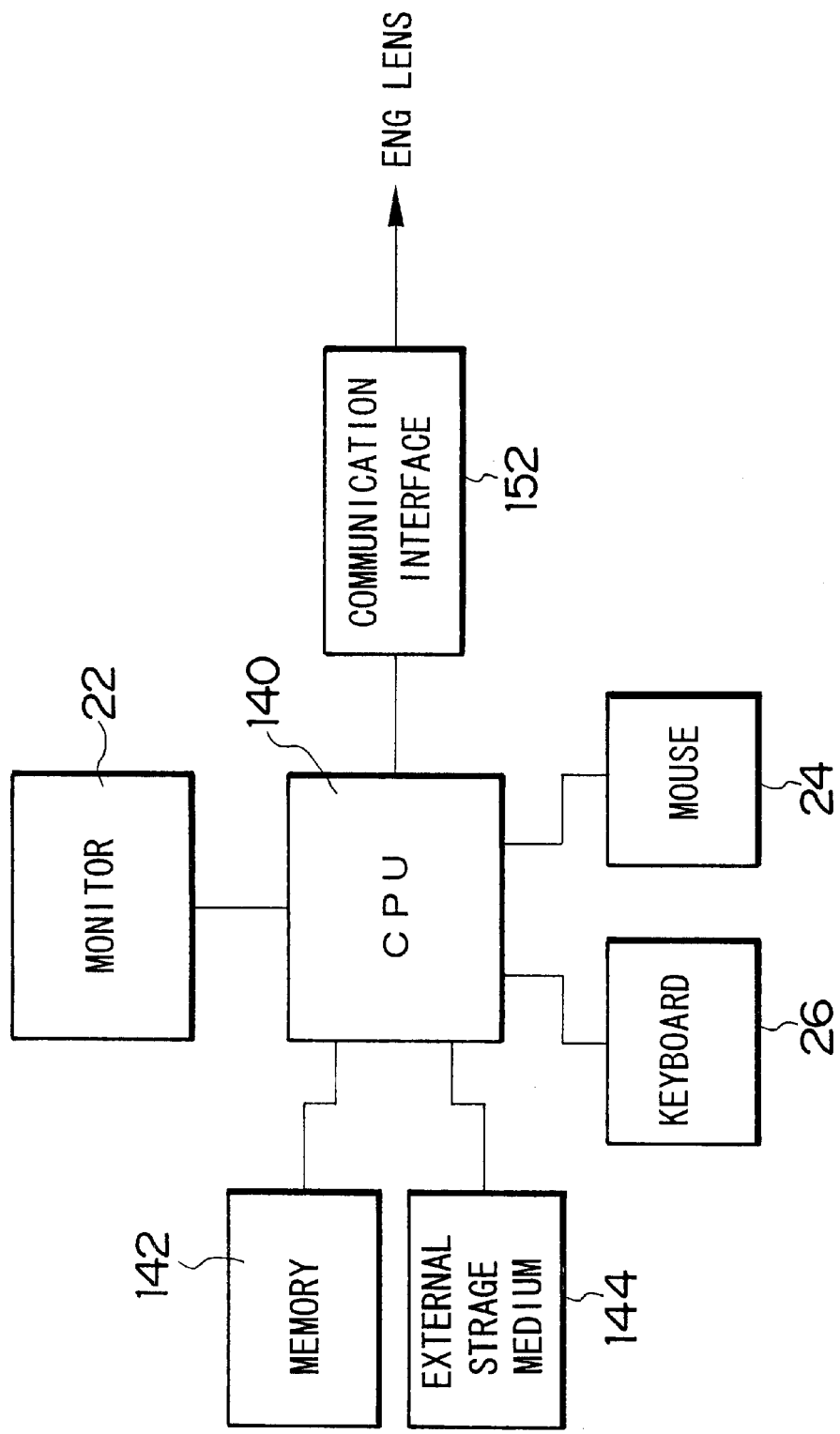
FIG. 5 is a block diagram showing a constitution of a personal computer.

Next, a description is given of the constitution of the personal computer 20, which is used as the lens controller. FIG. 5 is a block diagram briefly showing the constitution of the personal computer 20. As shown in FIG. 5, the personal computer 20 comprises, as well known, a CPU 140, a memory (RAM) 142, an external storage medium 144 (e.g., a hard disk, a floppy disk, and the like), the monitor 22, the keyboard 26, the mouse 24, an RS232C interface 152, and so forth. The CPU 140 reads out from the external storage medium 144 the program to execute lens operation, and then executes the program, thereby a lens operation screen, described later, is displayed on the monitor 22. The CPU 140 detects the operations of the input device such as the mouse 24 and the keyboard 26, the operations being performed on the lens operation screen. Then, the CPU 140 transmits respective control signals to the CPU 80 of the drive unit 16 via the RS232C interface 152 in accordance with the operations. The CPU 140 also obtains necessary data from the CPU 80 of the drive unit 16 via the RS232C interface 152.

Figure 6:
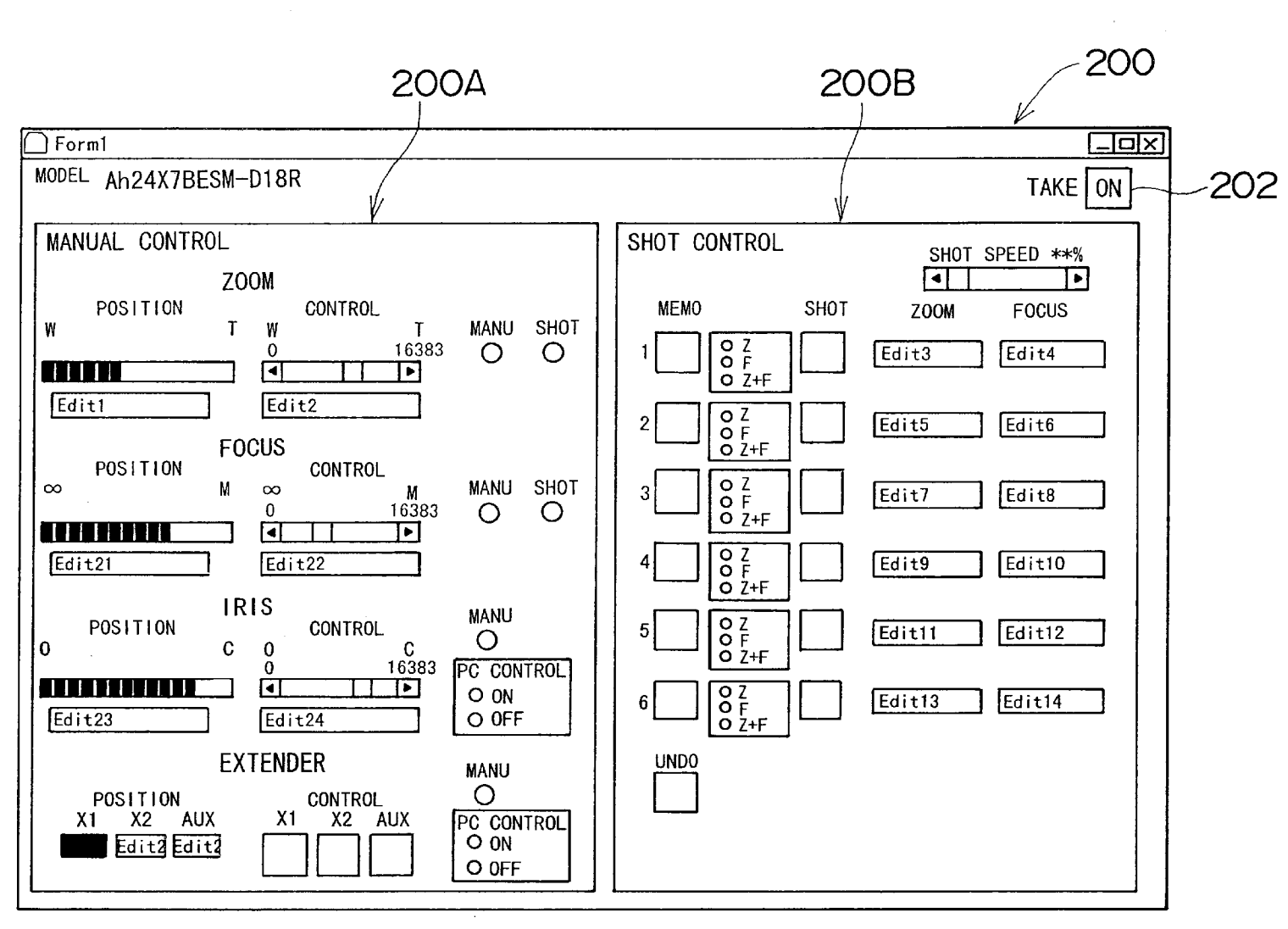

Next, description will be given on the constitution and operation method of the lens operation screen displayed on the monitor 22 of the personal computer 20. FIG. 6 illustrates an embodiment of the constitution of the lens operation screen. As shown in FIG. 6, a manual operation screen 200A for manually operating the lens is displayed on the left half of the lens operation screen 200 and a shot operation screen 200B for executing a shot function is displayed on the right half of the screen. The shot function reproduces, in accordance with a switch operation, the zoom position and the focus position that are stored beforehand.

Operations on the operation screens 200A and 200B are validated while a TAKE switch 202 is ON by clicking with the mouse 24 the TAKE switch 202, which is displayed on the upper right side of the screen (that is, by moving a pointer (not shown in the drawings) to the position of the TAKE switch 202 with the mouse 24 and pressing the click button of the mouse 24). The operations on the operation screens 200A and 200B are invalidated when the TAKE switch 202 is OFF by clicking with the mouse 24 the TAKE switch 202, and in that state zoom, focus, iris, and extender of the ENG lens 14 are controlled by lens controllers (such as the focus controller 82, the zoom controller 84, and the operating members of the drive unit 16) other than the personal computer 20. ON and OFF states of the TAKE switch 202 can be determined referring to the letters ON and OFF, which are displayed on the TAKE switch 202.

The constitution of the manual operation screen 200A will be described with reference to FIG. 7. Naming successively from the top, a zoom operation part 204, a focus operation part 206, an iris operation part 208, and an extender operation part 210, are displayed on the manual operation screen 200A.

Level display parts 212, 214, and 216, and digital display parts 218, 220, and 222 are displayed at the left sides of the zoom operating part 204, the focus operation part 206, and the iris operation part 208, respectively. Scroll bars 224, 226, and 228, and digital input parts 230, 232, and 234 are displayed at the center of the zoom operation part 204, the focus operation part 206, and the iris operation part 208, respectively.

Each of the level display parts 212, 214, and 216 displays with a bar graph to show by level the current position of each of the zoom, focus, and iris with respect to each movable range, so that each position can be visually observed.

On the other hand, each of the digital display parts 218, 220, and 222 displays the current position of each of the zoom, focus, and iris by means of a value found by converting each position with respect to each movable range into the value of 0–16383 corresponding to 14 bits resolution.

The current positions of the zoom, focus, and iris are displayed on the level display parts 212, 214 and 216 and the digital display parts 218, 220 and 222, not only in the case where the zoom, focus, and iris are manually operated on the manual operation screen 200A, but also in the case where the later-described shot function is executed. Moreover, as long as the lens operation screen 200 is displayed on the monitor 22, the current positions of the zoom, focus, and iris are displayed on the level display parts 212, 214 and 216 and the digital display parts 218, 220 and 222, also in the case where the TAKE switch 202 is OFF. Information of the current positions of the zoom, focus, and iris is transmitted from the CPU 80 of the drive unit 16.

The scroll bars 224, 226, and 228 enable the manual operations with regard to the zoom, focus, and iris by means of the positions of scroll boxes 224A, 226A, and 228A. The positions of the zoom, focus, and iris can be moved in the range of the values 0–16383 by dragging the scroll boxes 224A, 226A, and 228A with the mouse 24. When dragging the scroll boxes 224A, 226A, and 228A with the mouse 24, fine position adjustment of the scroll boxes 224A, 226A, and 228A is difficult. Thus, in order to finely adjust the scroll boxes, triangle marks 224B, 226B and 228B, which are displayed at both sides of the scroll bars 224, 226 and 228, are clicked so as to move the scroll boxes 224A, 226A and 228A unit by unit to right and left. If the right and left spaces of the scroll boxes 224A, 226A and 228A (between the scroll boxes 224A, 226A and 228A and the triangle marks 224B, 226B and 228B) are clicked by the mouse 24, the scroll boxes 224A, 226A and 228A are moved by 5 units to right and left.

As the positions of the scroll boxes 224A, 226A, and 228A are moved in the manner as described above, the target positions of the zoom, focus, and iris, which correspond to the moved positions, are transmitted from the personal computer 20 to the CPU 80 of the drive unit 16; and the zoom, focus, and iris are thus set at the target positions by the CPU 80.

The scroll bars 224, 226, and 228 are a type of operating members displayed on the screen. Instead of the scroll bars, other members in another form and/or of another operating method may be displayed on the screen so as to enable to manually operate the zoom, focus, and iris.

The target positions of the respective zoom, focus, and iris can be inputted as the values between 0–16383 through the digital input parts 230, 232, and 234. Each of the digital input parts 230, 232 and 234 is clicked by the mouse 24 to be in a state where a value can be inputted, and the desired target positions are inputted by values using the keyboard 26, so that the same operation as the case can be performed where the scroll boxes 224A, 226A, and 228A of the scroll bars 224, 226, and 228 are moved to the positions corresponding to the values.

As values are inputted in the digital input parts 230, 232 and 234, the target positions of the zoom, focus and iris that corresponds to the values are transmitted from the personal computer 20 to the CPU 80 of the drive unit 16, so that the zoom, focus and iris are controlled and set at the target positions by the CPU 80.

If the positions of the scroll boxes 224A, 226A, and 228A of the scroll bars 224, 226, and 228 are changed, the values in the digital input parts 230, 232, and 234 are correspondingly changed, and vise-versa.

Operation display parts 236 and 238, which notify whether the setting state of the current zoom position and the focus position is performed by the manual operation or the shot operation, are displayed at the right of the zoom operation part 204 and the focus operation part 206. On the operation display parts 236 and 238, lighting parts 236A and 238A that are lighted in a predetermined color in the manual operation, and lighting parts 236B and 238B that are lighted in a predetermined color in the shot operation, are displayed.

A lighting part 248 that is lighted in a predetermined color in the manual operation of the iris is displayed at the right of the iris operation part 208. Below the lighting part 248, a switch part 250 to choose whether to validate or invalidate the iris control of the personal computer 20, is displayed. As choosing "ON" of the switch part 250 with the mouse 24, the iris control in the personal computer 20 is validated, and as choosing "OFF" with the mouse 24, the iris control in the personal computer 20 is invalidated even though the TAKE switch 202 is ON. However, the current position display of the level display part 216 and the digital display part 222 are performed even though the iris control in the personal computer 20 is invalidated by the switch part 250.

An extender position display part 252 is displayed at the left side of the extender operation display part 210, and a switch part 254 is displayed at the center of the extender operation part 210. The extender position display part 252 displays the position of the extender, that is, an extender magnification (1-power, 2-power, and AUX) that is selected in the extender unit 38 of the ENG lens 14. Lighting parts 252A, 252B, and 252C are lighted in a predetermined color so as to correspond to the selected extender position. As to AUX, different extender magnifications correspond to the AUX depending on types of the extender unit 38.

The switch part 254 instructs switching the extender position. As clicking with the mouse 24 the switches 254A, 254B, and 254C corresponding to the respective extender positions, a command to switch magnification to correspond to the clicked switch is transmitted from the personal computer 20 to the CPU 80 of the drive unit 16, and the extender magnification is switched by the control of the CPU 80.

As is the case in the iris operation part 208, a lighting part 256 that is lighted in a predetermined color when the extender position is manually operated, is displayed at the right side of the extender operation part 210, and a switch part 258 is displayed below the lighting part 256 to choose whether to validate or invalidate the extender control of the personal computer 20. As selecting with the mouse 24 "ON" of the switch part 258, the extender control by the personal computer 20 is validated; as selecting "OFF", the extender control by the personal computer 20 is invalidated even though the TAKE switch 202 is ON. However, display for the current position in the extender position display part 252 is continued even though the extender control is invalidated.

The operation parts with regard to zoom, focus, iris, and extender are thus displayed on the manual operation screen 200A; however, if the lens unit that is connected with the personal computer 20 as shown in FIG. 1 controls another subject to control (e.g. a master lens) other than the zoom, focus, iris, and extender in accordance with an external control signal, another operation part with regard to the subject to control may be displayed on the lens operation screen 200, so that the subject can be controlled on the lens operation screen 200. Conversely, the operation part for the subject among the zoom, focus, iris, and extender that is uncontrollable by the lens unit may be eliminated from the lens operation screen 200. Moreover, the target positions of the zoom, focus, and iris are designated on the manual operation screen 200A; however, a rate control is also possible by designating the target rate.

The validation or invalidation with regard only to the control to the iris and extender can be independently chosen on the manual operation screen 200A; however such validation or invalidation may be chosen with regard also to the zoom and focus in the same manner.

Figure 8:
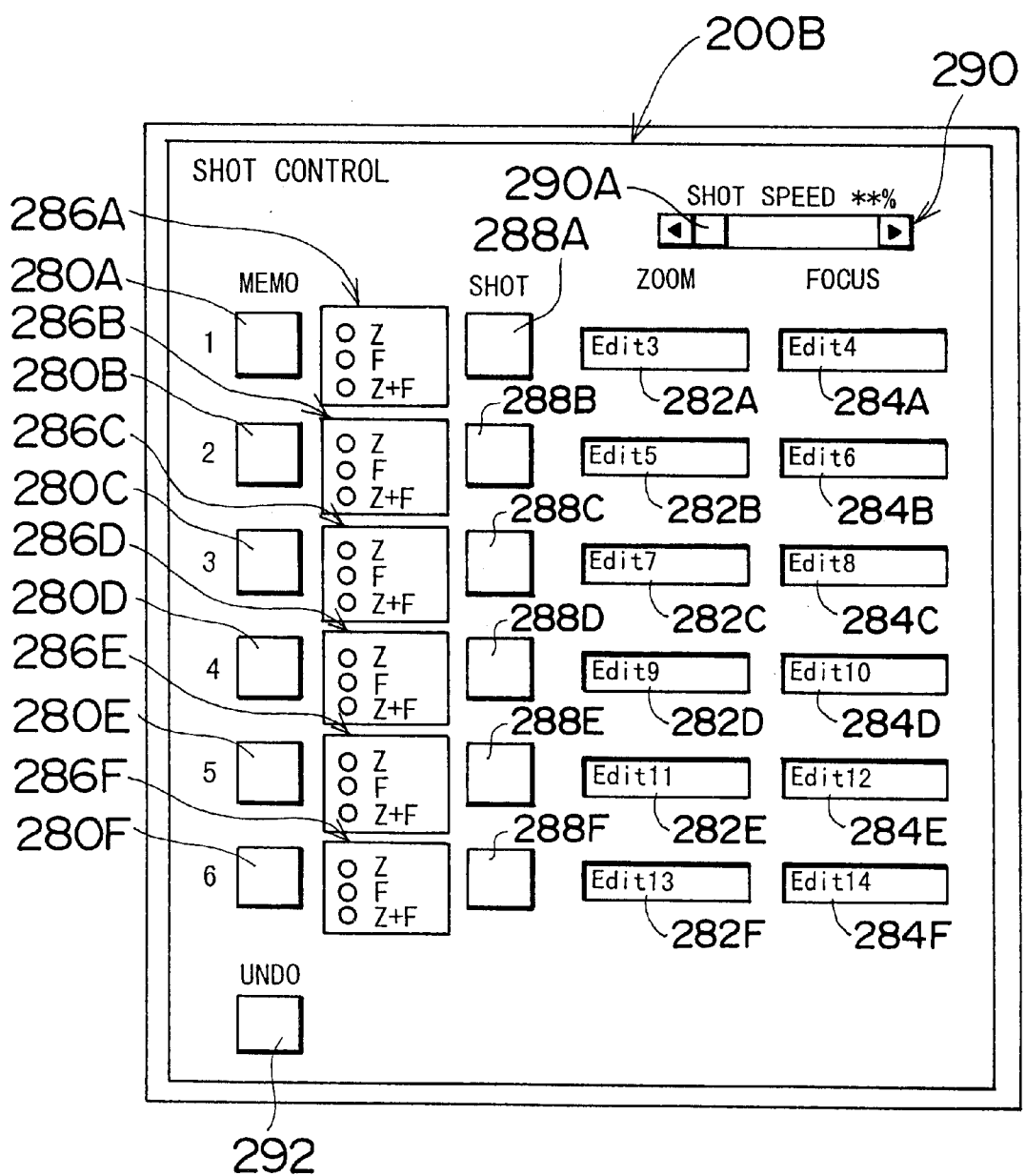
FIG. 8 is a view illustrating a constitution of a shot operation screen of the lens operation screen to be displayed on the monitor of the personal computer.

Next, the shot operation screen 200B will be described. As shown in FIG. 8, six memory switches 280A–280F are displayed on the most left column on the shot operation screen 200B. The memory switches 280A–280F respectively have shot numbers 1–6, so as to record six shot positions (the target positions for the zoom and focus at shot execution). As clicking with the mouse 24 the memory switch which corresponds to a desired shot number, the zoom position and the focus position of the ENG lens 14 at that time is registered as the shot position for the shot number. After that the zoom positions and the focus positions registered as the shot positions are respectively displayed on shot position display parts 282A–282F and 284A–284F at the right, as the values between 0–16383. When setting the zoom position and the focus position as the shot positions by turning on the memory switches 280A–280F (by clicking the mouse 24), it is troublesome to move the zoom position and the focus position to the desired positions beforehand by the manual operation so as to register them as shot positions. Thus, the zoom position and the focus position to be set as the shot positions may be inputted directly by the values on the shot position display parts 282A–282F and 284A–284F. Alternatively, the scroll bars similar with the one displayed on the manual operation screen 200A may be displayed with respect to the zoom and focus for respective shot numbers, so that the shot positions can be set at the desired positions by operating the positions of the scroll boxes of the scroll bars. In the case where the shot position can be set by both the values and the scroll bars (or the operating members displayed on the screen) as described above, when the shot position is set by one of the values and the scroll bars, it is preferable to move the display of the other of the values and the scroll bars according to the set shot position.

Selector parts 286A–286F, for selecting at shot execution whether to move one of the zoom and focus to the shot position or to move both zoom and focus to the shot positions, are displayed at the right of the memory switches 280A–280F. Each of the selector parts 286A–286F can be set with respect to each of the shot numbers 1–6, respectively. When selecting "Z" in the selector parts 286A–286F, only the zoom is moved to the shot positions at shot execution. When selecting "F", only the focus is moved to the shot position at shot execution. Further, when selecting "Z+F", both zoom and focus are moved to the shot positions at shot execution. When the memory switches 280A–280F are ON, both the zoom position and the focus position are registered as the shot positions regardless of the contents of the selector parts 286A–286F.

Shot switches 288A–288F, which correspond to the shot numbers 1–6, are displayed at the center of the shot operation screen 200B. As clicking with the mouse 24 one of the shot switches 288A–288F, the control signal for instructing shot execution is transmitted from the personal computer 20 to the CPU 80 of the drive unit 16, and at the same time the data of the shot positions corresponding to the shot number of the clicked shot switch, and the data of the subject of shot execution (zoom and focus), which are set by the corresponding one of the selector parts 286A–286F, are transmitted. Thereby, the zoom and focus are moved at the shot positions corresponding to the shot number of the clicked shot switch by the control of the CPU 80.

When one of the shot switches 288A–288F is turned on (by clicking with the mouse 24), the lighting parts 236B and 238B for displaying the shot operation are lighted in the predetermined colors on the operation display parts 236 and/or 238 of the manual operation screen 200A, which relates to the zoom or focus (or both) to which the shot operation is performed. The lighting parts 236B and 238B for displaying the shot operation are kept lit afterwards, until the manual operation is performed using the scroll bars 224, 226 and the like on the manual operation screen 200A.

If the zoom position and the focus position that are displayed by the scroll bars 224 and 226 and the digital input parts 230 and 232 of the manual operation screen 200A are unchanged as the shot control is executed as described above, the displayed zoom position and the focus position are different from the actual zoom position and the focus position; consequently, when a manual operation is performed after execution of the shot control, the zoom position and the focus position return to the positions that are designated by the scroll bars 224 and 226 and the like, and the manual operation using the shot positions as the origins cannot be performed. Concerning the above, the positions of the scroll boxes 224A and 226A of the scroll bars 224 and 226 and the values of the digital input parts 230 and 232 are automatically changed following the actual zoom position and the focus position. The positions of the scroll boxes 224A and 226A of the scroll bars 224 and 226 and the values of the digital input parts 230 and 232 always correspond to the zoom position and the focus position that are displayed on the level display parts 212 and 214 and the digital display parts 218 and 220. Therefore, the manual operation after execution of the shot control is possible using the shot positions as the origins.

A scroll bar 290 is displayed at the upper part of the shot operation screen 200B. The scroll bar 290 adjusts with the position of a scroll box 290A the moving rate (shot rate) of the zoom or focus at the shot execution. The scroll bar 290 is operated by moving with the mouse 24 the position of the scroll box 290A so as to set the desired shot rate in the same manner as the operating method for the scroll bars 224–228. If "Z" or "F" is selected by the selector parts 286A–286F, the shot rate for the zoom or focus at shot execution is the shot rate that is designated at the position of the scroll box 290A. If "Z+F" is selected by the selector parts 286A–286B, the shot rate for the zoom and focus are set at different rates so that both zoom and focus simultaneously reach the shot positions. In this case, the faster rate of the shot rates between the zoom and focus, which are set at different rates, is set to be the shot rate that is designated with the position of the scroll box 290A. The scroll bar 290 sets a common shot rate with respect to all the shot numbers, and cannot respectively set shot rates for every shot number. However, scroll bars similar as the scroll bar 290 may be displayed for every shot number so as to respectively set the shot rate for every shot number.

An undo switch 292 for executing an undo function (return function) is displayed at the lower part of the shot operation screen 200B. The undo function stores the zoom position and focus position at the start of shot execution when clicking with the mouse 24 the shot switches 288A–288F, and returns the zoom position and focus position to the original position at the start of the shot execution as clicking with the mouse 24 the undo switch 292 after completion of the shot operation. As the shot control is executed, the undo function is particularly effective to the case where the positions of the scroll boxes 224A and 226A of the scroll bars 224 and 226 and the values of the digital input parts 230 and 232 are automatically changed by following the actual zoom position and the focus position. In that case, the zoom position and/or the focus position can be returned to the positions where the shot control has not been executed, even though the positions where the shot control has not executed is unrecognizable referring to the scroll boxes 224A and 226A of the scroll bars 224 and 226 and so forth.

As described above, the zoom, focus, iris, and extender of the ENG lens 14 can be respectively controlled by the lens operation screen 200 using the mouse 24.

The operations of the lens operation screen 200 are performed with the mouse 24 and the keyboard 26; however, the operation screen may be operated by directly touching the screen through a touch panel.

Moreover, the shot function can be performed on the shot operation screen 200B only with regard to the zoom and focus; however, if another type of lens (e.g. a master lens) is installed in the lens system, the shot function may be used with regard to the type of lens in the similar manner as the zoom and focus.

Figure 9:
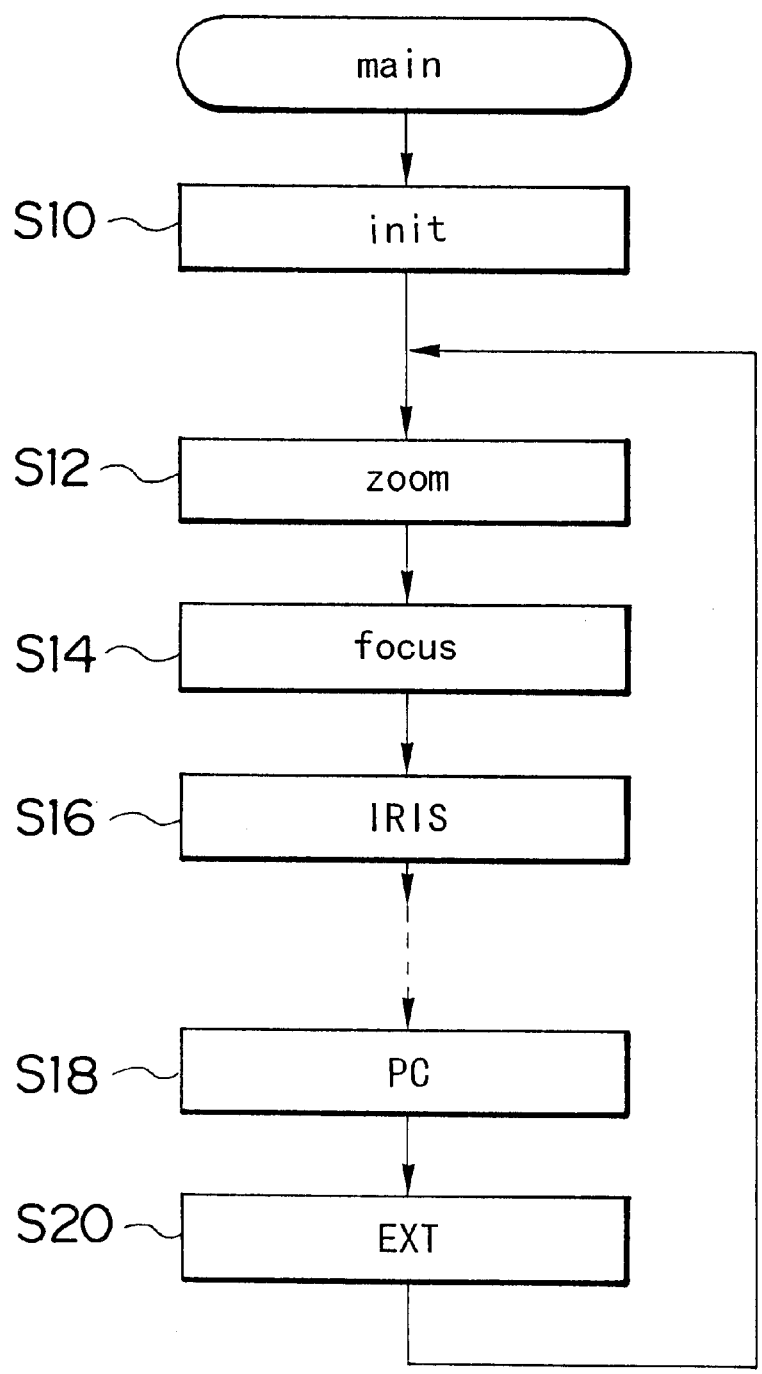
FIG. 9 is a flow chart showing a process of a main routine in a CPU of the drive unit for the ENG lens.

Next, the procedure of the CPU 80 of the drive unit 16 will be described with reference to flowcharts shown in FIGS. 9–15, and the main routine shown in FIG. 9 is described first. The CPU 80 performs initialization (S10) after the electricity is supplied, and successively performs zoom control (S12), focus control (S14), and iris control (S16). The CPU 80 performs processes required to a type of the lens unit, and controls the communication with the personal computer 20 (S18), and performs further the extender control (S20). Then, the CPU 80 repeatedly executes this process routine from S12 to S20.

Figure 10:
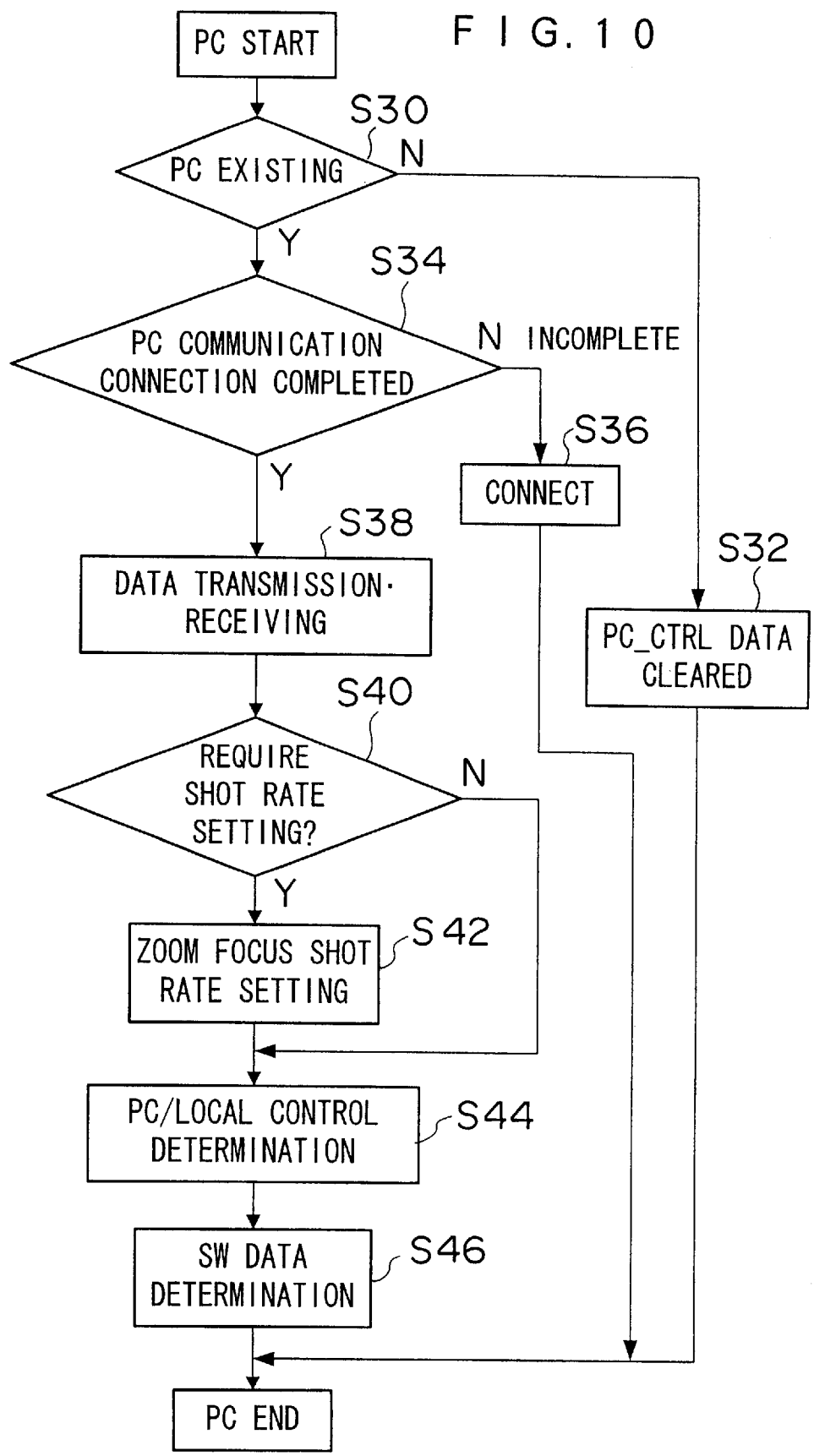
FIG. 10 is a flow chart showing a process routine for communication control between the drive unit for the ENG lens and the personal computer in the CPU.

Here, the process routine in S18 for the communication control between the CPU 80 and the personal computer 20 is described using the flowchart in FIG. 10. First, the CPU 80 determines whether the personal computer 20 connects with the RS232C connector 66 (see FIG. 3) (S30). If the determination is NO, all the control information necessary to perform each control by the personal computer 20 is cleared (S32), and this process routine is ended.

If the determination at S30 is YES, the CPU 80 then determines whether the communication connection with the personal computer 20 is completed (S34). If the determination is NO, the communication connection is executed (S36), and this process routine is ended. If the communication connection is completed and the determination at S34 is YES, the CPU 80 then performs exchanging of the data with the personal computer 20 (data transmission and receiving) (S38). The contents of the process for the data transmission and receiving will be described later.

The CPU 80 next determines whether the shot rate setting is required or not in the data transmission and receiving in S38. The shot rate setting requirement will be mentioned later in the description on the data transmission and receiving process. The shot rate setting is required when the zoom and focus are both moved to the shot positions at the shot execution. If the determination is NO at S40, the step proceeds to S44, and if YES, the shot rate is set with regard to the zoom and focus (S42). The shot rates for each zoom and focus in the case where both the zoom and focus are moved to the shot position are the same as described about the scroll bar 290 of the lens operation screen 200.

Then, the CPU 80 determines whether the zoom, focus, iris, and extender are controlled by the personal computer 20 or by the controller other than the personal computer 20 (the zoom controller 84, the focus controller 82, and the like) (PC/LOCAL control determination) (S44). A control by the controller other than the personal computer 20 is called a LOCAL control.

Then, the CPU 80 determines ON/OFF data of each type of switches (such as each of switches 254A–254C of the switch portion for setting the extender position, and the memory switch 280A–280F and the shot switches 288A–288F of the shot operation screen) which are displayed on the lens operation screen 200 (S46).

In completion of the above process, this process routine is ended.

Figure 11:
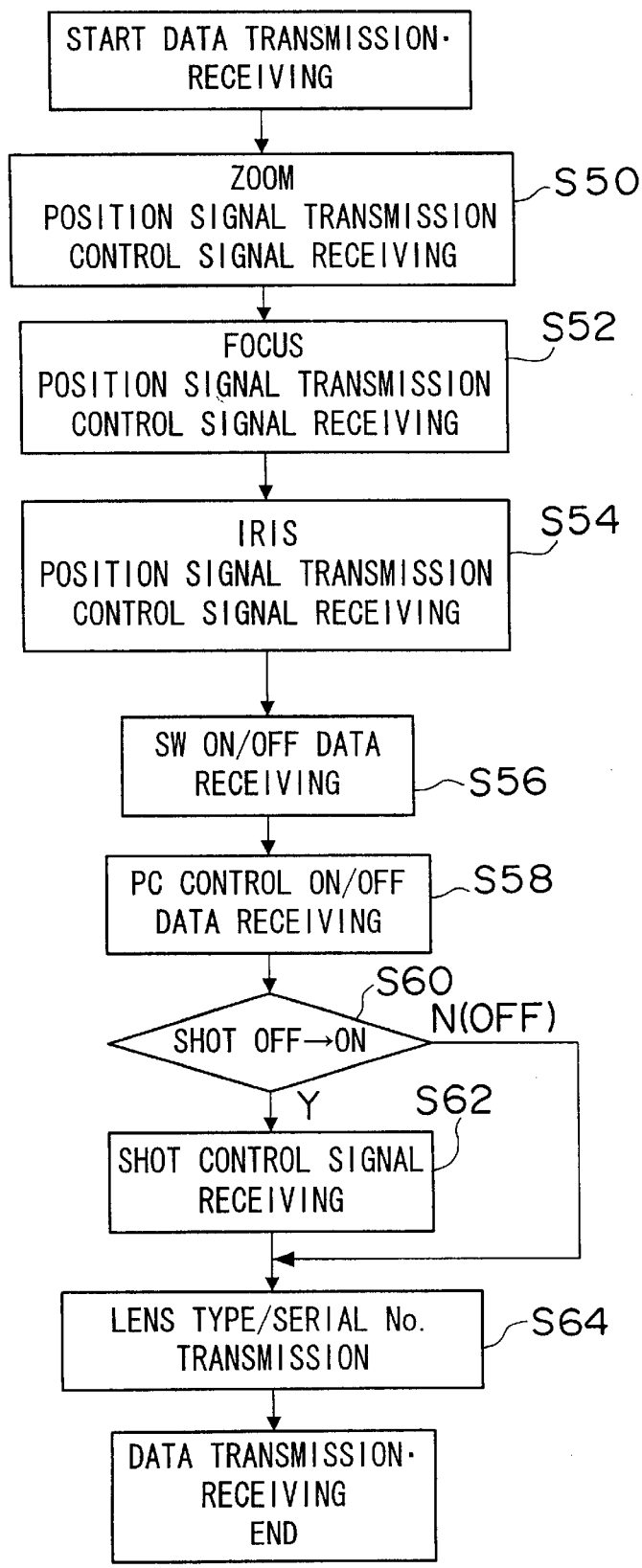
FIG. 11 is a flow chart showing a process routine for data transmission and receiving of the drive unit for the ENG lens in the CPU.

Next, a process routine for data exchange in S38 shown in FIG. 10 will be described using the flowchart in FIG. 11. As starting the data exchange between the CPU 80 and the personal computer 20, the CPU 80 first transmits the current zoom position to the personal computer 20 (position signal transmission) and at the same time receives the control signal with regard to the zoom from the personal computer 20 (control signal receiving) (S50). Then, the CPU 80 transmits to the personal computer 20 the current focus position (position signal transmission) and at the same time receives from the personal computer 20 the control signal with regard to the focus (control signal receiving) (S52). The CPU 80 also transmits the current iris position (position signal transmission) and at the same time receives the control signal with regard to the iris (control signal receiving) (S54). At that point, the zoom position, focus position, and iris position which are transmitted from the CPU 80 to the personal computer 20, are used as display data of the level display parts 212, 214, and 216, and the digital display parts 218, 220, and 222, of the lens operation screen which is displayed on the monitor 22 of the personal computer 20. The control signals with regard to the zoom, focus, and iris which the CPU 80 receives from the personal computer 20 are the control signals showing the target positions for the zoom, focus, and iris which are set by the scroll bars 224, 226, and 228, or by the digital input parts 230, 232, and 234, of the manual operation screen 200A that is displayed on the monitor 22 of the personal computer 20.

Then, the CPU 80 receives from the personal computer 20 the ON/OFF data of each type of switches (such as each of the switches 254A–254C of the switch part 254 for setting the extender position, and the memory switches 280A–280F on the shot operation screen, and the shot switches 288A–288F) on the lens operation screen 200 which is displayed on the monitor 22 of the personal computer 20 (S56).

Moreover, the CPU 80 receives from the personal computer 20 the ON/OFF data (personal computer-controlled ON/OFF data) for determining whether the zoom, focus, iris, and extender are controlled by the personal computer or not (S58). In short, the CPU 80 receives both the ON/OFF data of the TAKE switch 202 and the ON/OFF data of the switch parts 250 and 258 of the lens operation screen 200. As shown in the flowchart in FIG. 12 which illustrates the contents of the process at S58, the CPU 80 then sets whether the zoom, focus, iris, and extender are controlled by the personal computer or a local controller in accordance with the ON/OFF data (S80). As described above, if the TAKE switch 202 is OFF, all the zoom, focus, iris, and extender are set in the LOCAL control, and if the TAKE switch 202 is ON, the zoom and the focus are set to be controlled by the personal computer. However the iris and the extender are set by ON/OFF of the switch parts 250 and 258, respectively, even if the TAKE switch 202 is ON. If the switch part 250 is ON under a state where the TAKE switch 202 is ON, the iris is set to be controlled by the personal computer; if the switch part is OFF, the iris is set in the LOCAL control. Likewise, if the switch part 258 is ON under the state where the TAKE switch 202 is ON, the extender is set to be controlled by the personal computer; if the switch part 258 is OFF, the extender is set in the LOCAL control. The contents, set at S80, are used as they are, in the determination at S44 in FIG. 10.

After that, the CPU 80 determines whether or not one of the shot switches 288A–288F on the lens operation screen 200 is switched from OFF to ON in accordance with the data which are received from the personal computer 20 at S56 (S60). If the determination is NO, the process proceeds to S64; if the determination is YES, the CPU 80 receives the control signal with regard to the shot operation (S62). The process for S62 will be described later.

As to the transmission and receiving of the data, the CPU 80 transmits a lens type and a serial No. to the personal computer 20 (S64) and ends this process routine.

Next, a process routine for zoom position signal transmission and the zoom control signal receiving at S50 in FIG. 11 will be described using the flowchart in FIG. 13. The CPU 80 starts to process the zoom position signal transmission and the control signal receiving, and processes the control data which are received from the personal computer 20 (S70). The CPU 80 then determines first whether or not the zoom control signal, received from the personal computer 20, is changed (S72). The CPU 80 determines whether or not the scroll bars 224, 226, and 228, or the digital input parts 230, 232, and 234 of the manual operation screen 200A of the lens operation screen 200 of the personal computer 20 are operated. If the determination is NO, the CPU 80 ends this process routine; if the determination is YES, the CPU 80 puts a sign called a flag for manual operation (S74) and ends this process routine.

Figure 14:
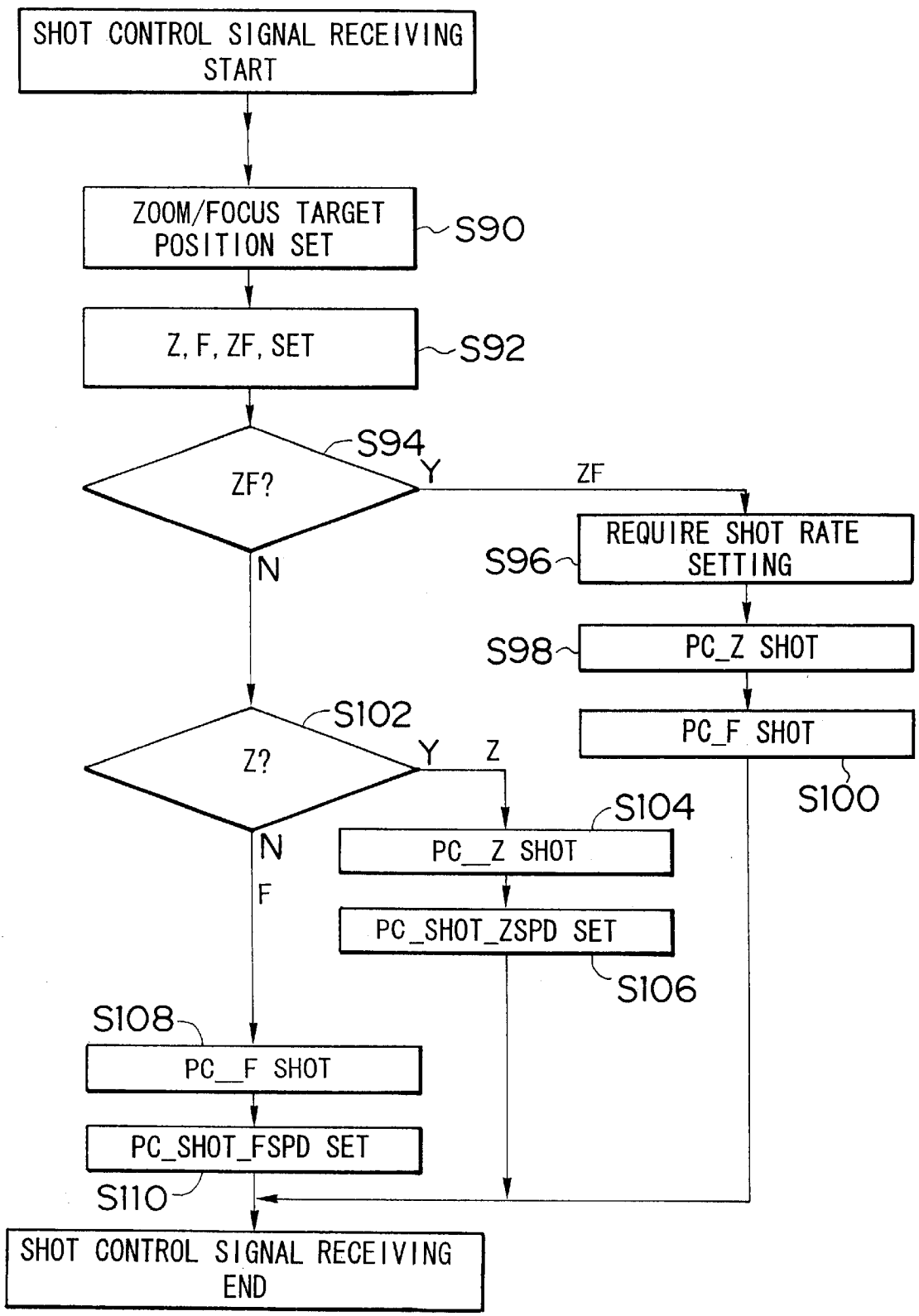
FIG. 14 is a flow chart showing a process routine for shot control signal receiving of the drive unit for the ENG lens in the CPU.

Now, a process routine for receiving the shot control signal at S62 in FIG. 11 will be described using the flowchart in FIG. 14. The CPU 80 starts receiving the shot control signal, and receives from the personal computer 20 the shot position which corresponds to the shot number of the shot switch which are ON at S60 in FIG. 11, then sets the target positions (shot positions) of the zoom and the focus at shot execution (S90). The shot positions are the zoom position and the focus position which are registered by turning ON the memory switches 280A–280F on the lens operation screen 200. After that the CPU 80 obtains set data for the selector parts 286A–286F on the lens operation screen 200, and then sets whether the zoom only, or the focus only, or both the zoom and the focus, is activated in accordance with the setting data (S92).

The CPU 80 now determines whether or not both the zoom and focus are activated for the shot operation (S94). If the determination is YES, that is, if the CPU 80 determines to activate both the zoom and focus for the shot operation, the CPU 80 puts a flag to require shot rate setting (S96), and puts flags for the zoom and focus (S98 and S100). The flag to require the shot rate setting executes the process for requiring the shot rates for the zoom and focus at S42 in FIG. 10. The flags for the zoom shot and focus shot require execution to the shot operation for the zoom and focus, respectively.

On the other hand, if the determination at S94 is NO, the CPU 80 then determines whether or not only the zoom is activated the shot operation (S102). If the determination is YES, the CPU 80 puts the flag of the zoom shot (S104), and sets the shot rate of the zoom (S106). The shot rate is set in accordance with the position of the scroll box 290A of the scroll bar 290 on the lens operation screen 200.

If the determination is NO at S102, the CPU 80 puts the flag of the shot for the focus shot, and sets the shot rate of the focus (S110). Similarly as the zoom shot rate, the shot rate is also set in accordance with the position of the scroll box 290A of the scroll bar 290 on the lens operation screen 200.

As the process described above is ended, the CPU 80 ends this process routine.

The data required for controlling the zoom, focus, iris, and extender are obtained by the data exchange between the personal computer 20 and the CPU 80 in the above-described manner.

Figure 15:
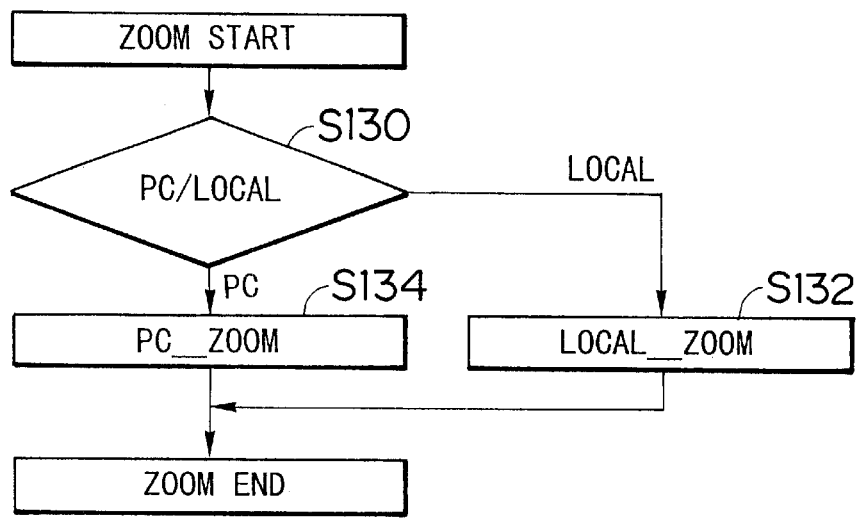
FIG. 15 is a flow chart showing a process routine for zoom control of the drive unit for the ENG lens in the CPU.

Next, a process routine for the zoom control at S12 in FIG. 9 will be described using the flowchart in FIG. 15. Note that the detailed descriptions are omitted on the focus control at S14, iris control at S16, and extender control at S20 since those controls are performed in the same manner as the zoom control which will be described below. The CPU 80 starts the zoom control and determines first whether the zoom is controlled by the personal computer or by the LOCAL controller (S130). Selection to which one of the control by the personal computer and the control by the LOCAL controller is performed to the zoom, is set at S44 in FIG. 10 or at S80 in FIG. 12. At this point, if the CPU 80 determines to use the LOCAL controller, the zoom is controlled in accordance with the control signal from the LOCAL zoom controller (S132). In the second case, if the CPU determines to use the personal computer, the zoom is controlled in accordance with the signals from the personal computer 20 (S134). Then, this process routine is ended.

Figure 16:
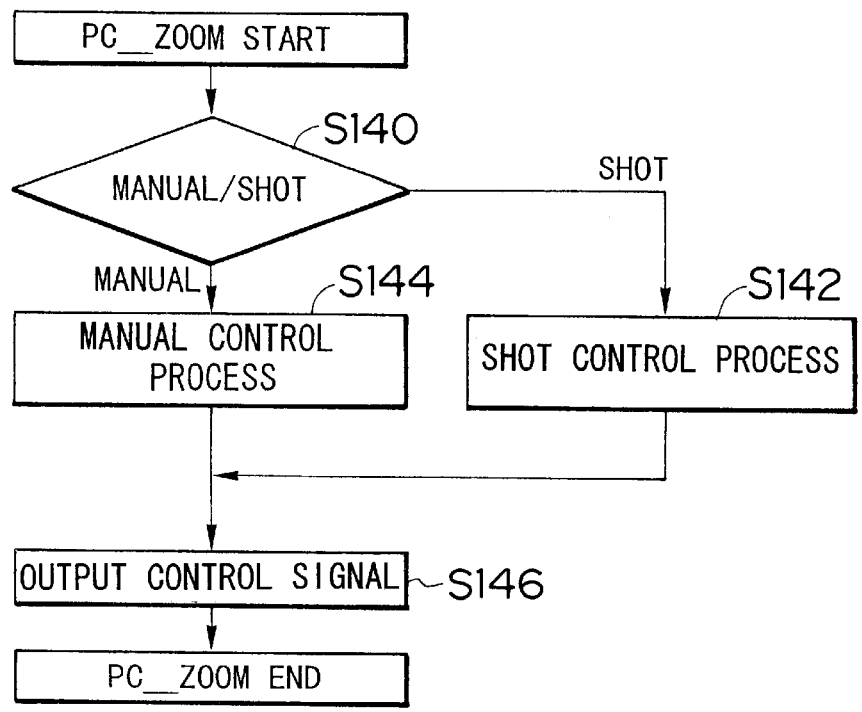
FIG. 16 is a flow chart showing a process routine for personal computer control of the drive unit for the ENG lens in the CPU.

As describing a process for control by the personal computer at S134 using the flowchart in FIG. 16, the CPU 80 starts controlling the personal computer and first determines whether the control will be the manual control or the shot control (S140). Whether the zoom is controlled by the manual control or the shot control is determined by whether the flag for the zoom shot is put which is set at S98 or S104, or by whether the flag for the manual operation at S74 in FIG. 13 is put. If the control is determined to be the shot control, the shot control process is executed (S142), and if the control is determined to be the manual control, the manual control process is executed (S144). Then, the control signals, generated by those processes, are outputted to the zoom control circuit 94 in the above-described manner so as to drive the zoom drive motor (S146). This process routine ends by the above-described process.

Following the process procedure described above, the respective controls for the ENG lens 14 is appropriately performed in accordance with the control signals which are transmitted by the personal computer 20.

In the above embodiment, the lens control of the ENG lens 14 is described; however, the present invention is not restricted for using the ENG lens only. The present invention is applicable to other types of lenses such as a boxshaped EFP lens and an HD lens which is used for a high-vision camera.

Moreover, the above embodiment operates with regard to respective lens controls on the screen of the monitor 22 of the personal computer 20 by connecting the personal computer 20 with the lens unit; but the personal computer 20 does not always have to be used. As shown in the above embodiment, the lens controller which has the display means for displaying the lens operations screen, or the designated input means such as the mouse 24 may be used for instructing the contents of control on the lens operation screen.

In the above embodiment, if the operating members (scroll bars 224 and 226) for operating the zoom position and the focus position are displayed on the screen of the monitor 22 in order to operate the operating members on the screen, the operating positions of the operating member at shot execution (the positions of the scroll boxes 224A and 226A of the scroll bars 224 and 226) are moved by following the actual zoom position and focus position. However the present invention is not restricted to operating the operating member on the screen. Likewise, the present invention can also be applied to a case where the zoom position and the focus position are operated in accordance with the operating position of the operating members such as the focus ring, which actually exists. The operating positions of the operating member can be moved by a motor and the like by following the operating positions with actual zoom position and the focus position at shot execution.

According to the lens control unit of the present invention described above, the operating members are moved by following the lens position as the lens position moves to the shot position by the shot execution. Therefore, the present invention can control by the shot execution the lens position using the lens position to where the lens is moved as the origin, and at the same time prevent the uncontrollable range from generating in the area where the lens is movable.

Further, the operating members are displayed and performed on the screen, so that the operating position of the operating member at the shot execution can easily be moved by following with the actual lens positions.

Furthermore, since the present invention is provided with the return function for returning, after the shot execution, the lens to the position where the shot execution is started; thus the lens can be returned to the lens position where the shot execution is started, even in a case that the operating positions of the operating members at shot execution are moved by following the actual lens position.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A lens control unit, comprising:
   a display which displays an image of an operating member displaying a present position of a lens disposed in a lens barrel;

an inputting device which moves the operating member on the display; and a control part which moves the lens in accordance with a position of the operating member on the display, the control part having a shot function for moving the lens to a position registered beforehand and moving the operating member on the display to a position corresponding to the position of the lens in response to an instruction to execute the shot function, wherein the control part has a return function for returning, in response to an instruction to execute the return function from a predetermined commanding device after the shot function is executed, the lens to a position at which the lens was positioned when the shot function was started.

2. The lens control unit as set forth in claim 1, wherein said display includes a monitor.

3. The lens control unit as set forth in claim 2, wherein said inputting device comprises a touch screen for entering selections which are displayed on said monitor.

4. The lens control unit as set forth in claim 2, wherein said inputting device comprises a mouse for entering selections which are displayed on said monitor.

5. The lens control unit as set forth in claim 1, wherein said control part includes a manual control portion which allows a user to manually control at least a zoom function of the lens.

6. The lens control unit as set forth in claim 5, wherein said manual control portion includes an operating member having a scroll bar for adjusting the zoom function of the lens based upon a position of a scroll member along the scroll bar.

7. The lens control unit as set forth in claim 5, wherein said manual control portion includes an operating member having a numeric input portion for adjusting the zoom function of the lens based upon a numeric value entered into said numeric input portion.

8. The lens control unit as set forth in claim 5, wherein said manual control portion includes a position indicator for indicating a position of the zoom function of the lens.

9. The lens control unit as set forth in claim 8, wherein said position indicator includes a graphical output for displaying a non-numeric graphical representative of the position of the zoom function of the lens.

10. The lens control unit as set forth in claim 8, wherein said position indicator includes a numeric value output for displaying a numeric value representative of the position of the zoom function of the lens.

11. The lens control unit as set forth in claim 5, wherein said manual control portion allows a user to manually control a focus function of the lens.

12. The lens control unit as set forth in claim 11, wherein said manual control portion allows a user to manually control an iris function of the lens.

13. The lens control unit as set forth in claim 12, wherein said manual control portion allows a user to manually control an extender function of the lens.

14. The lens control unit as set forth in claim 1, wherein said control part includes a shot control portion which allows a user to control said shot function of at least a zoom function of the lens.

15. The lens control unit as set forth in claim 14, wherein said shot control portion includes a numeric display portion which displays a numeric value representative of the position of the zoom function of the lens for a particular shot.

16. The lens control unit as set forth in claim 15, wherein said numeric display portion may receive a manually entered numeric value representative of the position of the zoom function of the lens for a particular shot.

17. The lens control unit as set forth in claim 1, wherein said wherein said control part includes a manual control portion which allows a user to manually control at least a zoom function of the lens, and a shot control portion which allows a user to control said shot function of the zoom function of the lens.

18. The lens control unit as set forth in claim 17, wherein said manual control portion allows a user to manually control a focus function of the lens, and said shot control portion allows a user to control said shot function of the focus function of the lens.

19. The lens control unit as set forth in claim 18, wherein said manual control portion allows a user to manually control an iris function of the lens.

* * * * *